(12) United States Patent
Zhou et al.

(10) Patent No.: US 12,461,326 B2
(45) Date of Patent: Nov. 4, 2025

(54) STEEL FIBER COMPOSITE INTELLIGENT BAR WITH SHEATHING OPTICAL CABLE EMBEDDED IN INNER CORE OF REBAR, AND FABRICATION METHOD THEREOF

(71) Applicant: Shenzhen University, Guangdong (CN)

(72) Inventors: Yingwu Zhou, Guangdong (CN); Feng Xing, Guangdong (CN); Zenghui Ye, Guangdong (CN); Xiaoxu Huang, Guangdong (CN); Zongjun Li, Guangdong (CN); Zhongfeng Zhu, Guangdong (CN); Rui Hu, Guangdong (CN)

(73) Assignee: Shenzhen University, Guangdong (CN)

( * ) Notice: Subject to any disclaimer, the term of this patent is extended or adjusted under 35 U.S.C. 154(b) by 0 days.

(21) Appl. No.: 18/707,828

(22) PCT Filed: Aug. 31, 2023

(86) PCT No.: PCT/CN2023/116199
§ 371 (c)(1),
(2) Date: May 6, 2024

(87) PCT Pub. No.: WO2024/046427
PCT Pub. Date: Mar. 7, 2024

(65) Prior Publication Data
US 2025/0199258 A1  Jun. 19, 2025

(30) Foreign Application Priority Data

Aug. 31, 2022 (CN) .......................... 202211059358.2

(51) Int. Cl.
*G02B 6/44* (2006.01)
*E04C 5/07* (2006.01)
*G01B 11/16* (2006.01)

(52) U.S. Cl.
CPC ................ *G02B 6/443* (2013.01); *E04C 5/07* (2013.01); *G01B 11/16* (2013.01); *G02B 6/4484* (2013.01); *G02B 6/4488* (2013.01)

(58) Field of Classification Search
CPC .... G02B 6/443; G02B 6/4484; G02B 6/4488; G01B 11/16; E04C 5/07
See application file for complete search history.

(56) References Cited

U.S. PATENT DOCUMENTS

2003/0082380 A1    5/2003  Hager et al.
2004/0197059 A1*  10/2004  Castellani ............... C08L 23/10
                                                                           385/112
2019/0033145 A1    1/2019  Dyer et al.

FOREIGN PATENT DOCUMENTS

CN        1936206 A    3/2007
CN      102146713 A    8/2011
(Continued)

OTHER PUBLICATIONS

First office action for CN 202211059358.2, dated Jan. 18, 2023. China National Intellectual Property Administration Patent Office, Beijing, China.
(Continued)

*Primary Examiner* — Daniel Petkovsek
(74) *Attorney, Agent, or Firm* — Tutunjian & Bitetto, P.C.

(57) ABSTRACT

Disclosed are a steel fiber composite intelligent bar with a sheathing optical cable embedded in an inner core of a rebar, and a fabrication method thereof. The steel fiber composite intelligent bar includes the sheathing optical cable, the rebar, a winding layer, and tightening sheaths, wherein the sheathing optical cable comprises a glass fiber core, a polyimide coating layer, and a polyurethane wrapping layer that are stacked sequentially from inside to outside; the rebar is provided with a notch groove along a length direction; and the sheathing optical cable is embedded in the notch groove (Continued)

in parallel; the winding layer is wound around an outer surface of the rebar, and the winding layer is made of an epoxy resin composite fiber; and the tightening sheaths comprise a first tightening sheath and a second tightening sheath which are sleeved at two ends of the winding layer, respectively.

10 Claims, 8 Drawing Sheets

(56) References Cited

FOREIGN PATENT DOCUMENTS

| CN | 205688663 | U |   | 11/2016 |             |
|----|-----------|---|---|---------|-------------|
| CN | 107385981 | A |   | 11/2017 |             |
| CN | 109577558 | A |   | 4/2019  |             |
| CN | 213927094 | U |   | 8/2021  |             |
| CN | 115262862 | A |   | 11/2022 |             |
| CN | 217710327 | U |   | 11/2022 |             |
| CN | 107740297 | B | * | 3/2023  | D07B 1/144  |
| EP | 3486394   | B1| * | 11/2023 | D07B 1/145  |
| JP | 2017223502| A | * | 12/2017 | G01B 11/16  |
| JP | 2019101267| A |   | 6/2019  |             |
| JP | 2019184596| A |   | 10/2019 |             |

OTHER PUBLICATIONS

International Search Report for PCT/CN2023/116199, dated Nov. 24, 2023. Searching Authority China National Intellectual Property Administration, Beijing, China.
Notification to Grant for CN 202211059358.2, dated Mar. 16, 2023. China National Intellectual Property Administration Patent Office, Beijing, China.
Written Opinion of the Searching Authority for PCT/CN2023/116199, dated Nov. 24, 2023. Searching Authority China National Intellectual Property Administration, Beijing, China.

* cited by examiner

STEEL FIBER COMPOSITE INTELLIGENT BAR WITH SHEATHING OPTICAL CABLE EMBEDDED IN INNER CORE OF REBAR, AND FABRICATION METHOD THEREOF

CROSS REFERENCE TO RELATED APPLICATION

The present application is a national stage application of International Patent Application No. PCT/CN2023/116199, filed on Aug. 31, 2023, which claims priority to the Chinese Patent Application No. CN202211059358.2, filed with the China National Intellectual Property Administration (CNIPA) on Aug. 31, 2022, and entitled "STEEL FIBER COMPOSITE INTELLIGENT BAR WITH SHEATHING OPTICAL CABLE EMBEDDED IN INNER CORE OF REBAR, AND FABRICATION METHOD THEREOF". The disclosure of the two applications is incorporated herein by reference in its entirety.

TECHNICAL FIELD

The present disclosure belongs to the technical field of building materials, and specifically relates to a steel fiber composite intelligent bar with a sheathing optical cable embedded in an inner core of a rebar, and a fabrication method thereof.

BACKGROUND

Reinforced concrete (RC) structure has characteristics such as excellent firmness, excellent durability, excellent fire resistance, and low construction cost, and is a widely used structural form at present. In RC structures, rebars, as the main tensile materials, have excellent strength and deformation properties, but also have the disadvantage of easy corrosion. Steel fiber composite bar (SFCB) is a new reinforced composite material with a rebar as a core and a longitudinal fiber as a sheath, and has characteristics such as high strength, excellent ductility, high elastic modulus, stable secondary stiffness, and excellent corrosion resistance. The wrapping of an ordinary rebar with a corrosion-resistant fiber-reinforced polymer (FRP) can protect the rebar from erosion and improve the durability of a concrete structure. For example, patent document CN1936206A (Anti-seismic structure of steel fiber-reinforced concrete) discloses an anti-seismic structure constructed by bonding an FRP with concrete. However, this anti-seismic structure does not have the function of sensing its own stress state or the stress state of a corresponding structure.

The distributed optical fiber sensing technology has advantages such as anti-electromagnetic interference, high accuracy, small size, superior stability, integration of data transmission and sensing, and easy combination with a sample to be tested, and has been widely used in the sensing measurement and health monitoring of civil engineering. The patent document CN102146713A (FRP fiber-optic intelligent composite bar embedded with steel wire strand therein) discloses a FRP fiber-optic intelligent composite bar embedded with a steel wire strand, which is obtained by compounding an optical fiber sensor with an FRP steel strand composite bar. However, in this patent, bare optical fibers are adopted, and are brittle and easy to break during the fabrication process.

SUMMARY

In view of this, an object of the present disclosure is to provide a steel fiber composite intelligent bar with a sheathing optical cable embedded in an inner core of a rebar, and a fabrication method thereof. In the steel fiber composite intelligent bar with a sheathing optical cable embedded in an inner core of a rebar provided by the present disclosure, a sheathing optical cable is adopted, and the sheathing optical cable is not easy to break and has a high optical fiber survival rate.

In order to achieve the above object, the present disclosure provides the following technical solutions:

The present disclosure provides a steel fiber composite intelligent bar with a sheathing optical cable embedded in an inner core of a rebar, including the sheathing optical cable 6, the rebar 5, a winding layer 8, and tightening sheaths 9, wherein the sheathing optical cable 6 includes a glass fiber core 1, a polyimide coating layer 2, and a polyurethane wrapping layer 3 that are stacked sequentially from inside to outside;

the rebar 5 is provided with a notch groove 4 along a length direction; the sheathing optical cable 6 is embedded in the notch groove 4 in parallel;

the winding layer 8 is wound around an outer surface of the rebar 5, and the winding layer 8 is made of an epoxy resin composite fiber; and the tightening sheaths 9 include a first tightening sheath and a second tightening sheath which are sleeved at two ends of the winding layer 8, respectively.

In some embodiments, the glass fiber core 1 is an SMG.652b glass core.

In some embodiments, the sheathing optical cable 6 has a diameter of less than 1 mm.

In some embodiments, a length of the sheathing optical cable 6 is greater than that of the rebar 5, the sheathing optical cable 6 extends out of two ends of the rebar 5, and two parts of the sheathing optical cable 6 extending out of the two ends of the rebar 5 are each sleeved with a corrugated sleeve 7.

In some embodiments, the corrugated sleeve 7 is a stainless steel corrugated sleeve.

In some embodiments, the corrugated sleeve 7 has an inner diameter of 1 mm.

In some embodiments, the notch groove 4 is a square groove of 1 mm×1 mm; a number of the notch groove 4 is not less than 1; and a number of the sheathing optical cable 6 is not less than 1.

In some embodiments, the winding layer 8 has a thickness of 1 mm to 2 mm.

In some embodiments, the tightening sheaths 9 are each sleeved at two ends of the winding layer 8 by 20 mm, and the tightening sheaths 9 are each at least 50 mm shorter than the sheathing optical cable 6.

The present disclosure also provides a method for fabricating the steel fiber composite intelligent bar as described in the above technical solutions, including:

notching a groove along a length direction of the rebar 5 to form the notch groove 4;

fixing the sheathing optical cable 6 in the notch groove 4 in parallel, winding the rebar 5 with an epoxy resin composite fiber, and curing to obtain a rebar 5 clad with the winding layer 8; and sleeving the tightening sheaths 9 at two ends of the winding layer 8 from the sheathing optical cable 6 respectively to obtain the steel fiber composite intelligent bar, wherein the sheathing optical cable 6 extends out of two ends of the rebar 5.

In some embodiments, the fixing the sheathing optical cable 6 in the notch groove 4 in parallel is conducted by: bonding and fixing the sheathing optical cable 6 with an adhesive tape, and then encapsulating the notch groove 4 with a glue.

In some embodiments, the method further includes: sleeving the corrugated sleeve 7 at each of two parts of the sheathing optical cable 6 extending out of the two ends of the rebar 5.

In some embodiments, the sleeving the corrugated sleeve 7 at each of the two parts of the sheathing optical cable 6 extending out of the two ends of the rebar 5 is conducted by: reserving a non-sealing segment in each of two ends of the notch groove 4, sleeving the corrugated sleeve 7 at each of two ends of the sheathing optical cable 6, arranging the two ends of the sheathing optical cable in non-sealing segments of the two ends of the notch groove 4, respectively, and encapsulating the non-sealing segments with a glue.

In some embodiments, the non-sealing segment has a length of 10 mm.

In some embodiments, the epoxy resin composite fiber includes an epoxy resin-impregnated fiber cloth and an epoxy resin-impregnated fiber bundle; and
  a fiber cloth in the epoxy resin-impregnated fiber cloth is selected from the group consisting of a carbon fiber cloth, a glass fiber cloth, and a basalt fiber cloth; and a fiber bundle in the epoxy resin-impregnated fiber bundle is selected from the group consisting of a carbon fiber, a basalt fiber, a glass fiber, an aramid fiber, and a plant fiber.

In some embodiments, the rebar 5 is a plain round rebar.

In some embodiments, before the winding, the method further includes: wrapping the two parts of the sheathing optical cable 6 extending out of the two ends of the rebar 5 with a plastic film, wherein the plastic film is a plastic wrap.

In some embodiments, the curing is conducted at a temperature of 30° C. to 35° C.

In some embodiments, a diameter of each of the tightening sheaths 9 is 1 mm greater than that of the rebar 5 clad with the winding layer 8; the sheathing optical cable 6 is at least 50 mm longer than each of the tightening sheaths 9; and a length of an end of the rebar 5 clad with the winding layer 8 that is sleeved with each of the tightening sheath 9 is at least 20 mm.

In some embodiments, the method further includes: heating the tightening sheaths 9.

The present disclosure provides a steel fiber composite intelligent bar with a sheathing optical cable embedded in a groove on a surface of an inner core of a rebar, including the sheathing optical cable 6, the rebar 5, a winding layer 8, and tightening sheaths 9, wherein the sheathing optical cable 6 includes a glass fiber core 1, a polyimide coating layer 2, and a polyurethane wrapping layer 3 that are stacked sequentially from inside to outside; the rebar 5 is provided with a notch groove 4 along a length direction; the sheathing optical cable 6 is embedded in the notch groove 4 in parallel; the winding layer 8 is wound around an outer surface of the rebar 5, and a material of the winding layer 8 is an epoxy resin composite fiber; and the tightening sheaths 9 include a first tightening sheath and a second tightening sheath which are sleeved at two ends of the winding layer 8, respectively.

The steel fiber composite intelligent bar provided by the present disclosure has a different structure from the traditional optical fiber intelligent composite bar. In the present disclosure, the sensing optical fiber is used as a sheathing optical cable, and is fabricated by combining a bare optical fiber with a sheath including a polyimide coating layer and a polyurethane wrapping layer. Compared with a bare optical fiber, the sheathing optical cable not only can improve the strength and surface friction, but also can be embedded into a rebar through a notch groove to improve the survival rate of the optical fiber. The notch groove on a surface of the rebar along a length direction can ensure that the embedded sheathing optical cable is parallel to the rebar. In addition, the sheathing optical cable is at an interface between the epoxy resin composite fiber and the rebar, which can comprehensively reflect the strain of the intelligent composite bar and ensure the accuracy of a measurement thereof. The wrapping of the epoxy resin composite fiber around the surface of the notch-grooved rebar embedded with the sheathing optical cable can lead to the formation of a wrapping layer to prevent the corrosion of the rebar core and the breakage of the sheathing optical cable. The SFCB embedded with the sheathing optical cable has a self-sensing function, and can be used as a stressed material, which can be used in the monitoring of strains of various complicated engineering structures. In summary, the steel fiber composite intelligent bar with a sheathing optical cable embedded in an inner core of a rebar provided by the present disclosure has characteristics such as high survival rate, self-perception, high-accuracy corrosion resistance, high strength, and engineering, and can meet the needs of measurement of complicated structures as a reinforcing material of the structure itself.

DETAILED DESCRIPTION OF THE EMBODIMENTS

Figure 1:
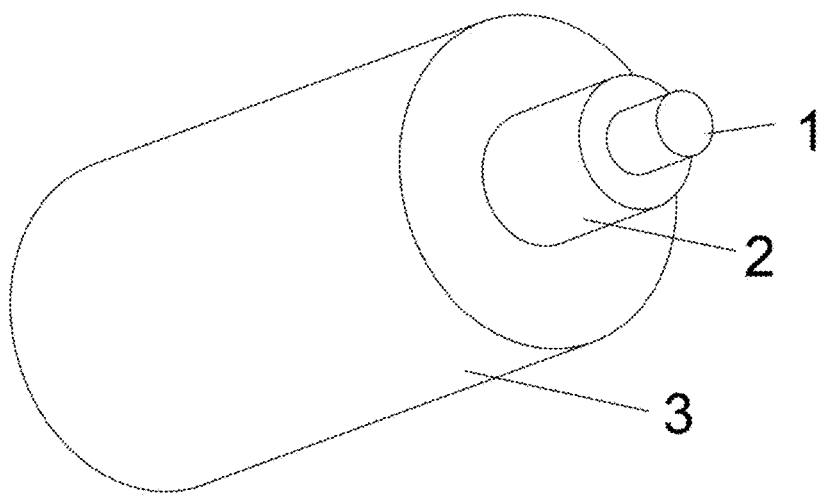
FIG. 1 shows a structural schematic diagram of the sheathing optical cable according to an embodiment of the present disclosure.

The present disclosure provides a steel fiber composite intelligent bar with a sheathing optical cable embedded in a groove on a surface of an inner core of a rebar, including the sheathing optical cable 6, the rebar 5, a winding layer 8, and tightening sheaths 9, wherein
the sheathing optical cable 6 includes a glass fiber core 1, a polyimide coating layer 2, and a polyurethane wrapping layer 3 that are stacked sequentially from inside to outside;
the rebar 5 is provided with a notch groove 4 along a length direction; and the sheathing optical cable 6 is embedded in the notch groove 4 in parallel;
the winding layer 8 is wound around an outer surface of the rebar 5, and the winding layer 8 is made of an epoxy resin composite fiber; and
the tightening sheaths 9 include a first tightening sheath and a second tightening sheath which are sleeved at two ends of the winding layer 8, respectively.

Unless otherwise specified, there are no special requirements on the source of the raw materials used, and the commercially available products well known to those skilled in the art may be used.

The steel fiber composite intelligent bar with a sheathing optical cable embedded in an inner core of a rebar provided by the present disclosure includes the sheathing optical cable 6. In the present disclosure, the sheathing optical cable 6 includes a glass fiber core 1, a polyimide coating layer 2, and a polyurethane wrapping layer 3 that are stacked sequentially from inside to outside. In some embodiments, the sheathing optical cable 6 has a diameter of less than 1 mm, and preferably less than or equal to 0.9 mm; and the glass fiber core 1 is an SMG.652b glass core. There are no limitations on the type of the sheathing optical cable, and the sheathing optical cable well known in the art may be used. In the art, the material of each of the glass core, the coating layer, and the wrapping layer can also be selected according to actual engineering needs. In some embodiments of the present disclosure, the sheathing optical cable is specifically a NZS-DSS-C07 type high-transmission and tightly-sheathed strain-sensing optical cable having a diameter of 0.9 mm.

The structure of the sheathing optical cable 6 according to an embodiment of the present disclosure is shown in FIG. 1. It can be seen from FIG. 1 that the center of the sheathing optical cable 6 is the glass fiber core 1, the glass fiber core 1 is wrapped with the polyimide coating layer 2, and the polyimide coating layer 2 is wrapped with the polyurethane wrapping layer 3.

The steel fiber composite intelligent bar with a sheathing optical cable embedded in an inner core of a rebar provided by the present disclosure includes the rebar 5. In the present disclosure, the rebar 5 is provided with a notch groove 4 along a length direction. In some embodiments, the notch groove 4 is a square groove of 1 mm×1 mm; a number of the notch groove 4 is not less than 1, and preferably 1. In the present disclosure, the sheathing optical cable 6 is embedded in the notch groove 4 in parallel. In some embodiments, a number of the sheathing optical cable is not less than 1, and preferably 1. In the present disclosure, the number of the notch groove on the rebar and the number of the embedded sheathing optical cable can be determined according to actual needs.

Figure 2:
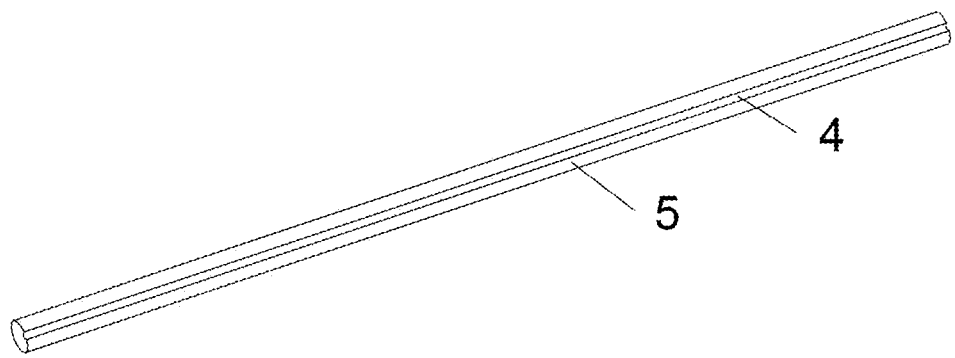
FIG. 2 shows a schematic diagram of the rebar with a notch groove according to an embodiment of the present disclosure.

The structure of the rebar 5 according to an embodiment of the present disclosure is shown in FIG. 2. It can be seen from FIG. 2 that the rebar used in the present disclosure is provided with the notch groove 4 along the length direction.

In some embodiments of the present disclosure, a length of the sheathing optical cable 6 is greater than that of the rebar 5, the sheathing optical cable 6 extends out of two ends of the rebar 5, and two parts of the sheathing optical cable 6 extending out of the two ends of the rebar 5 are each sleeved with a corrugated sleeve 7; the corrugated sleeve 7 is a stainless steel corrugated sleeve; and the corrugated sleeve 7 has an inner diameter of 1 mm.

In the present disclosure, the sheathing optical cable embedded in the groove of the rebar should be sufficient to extend out of the concrete structure and reserve a sufficient length for connection with a fiber optic patch cable.

Figure 3:
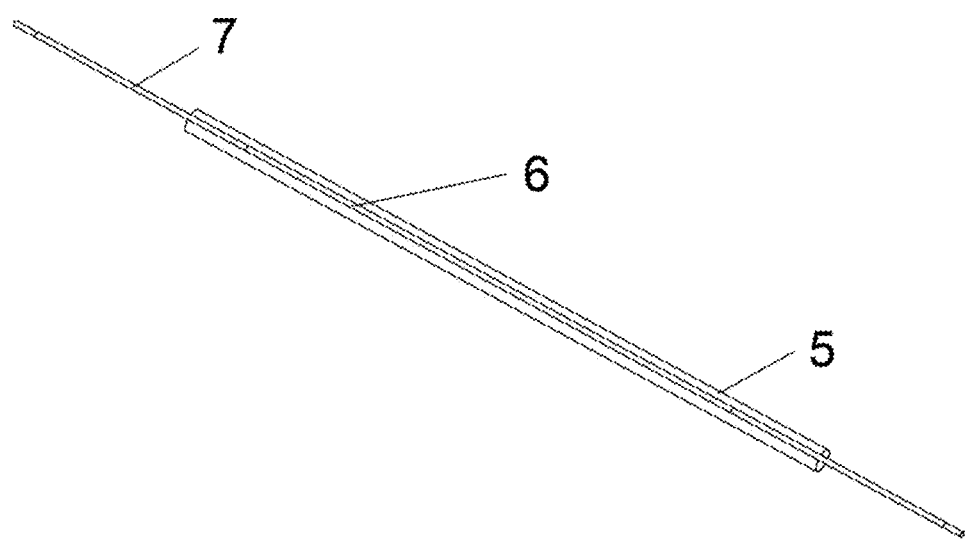
FIG. 3 shows a schematic diagram of the sheathing optical cable according to an embodiment of the present disclosure, two ends of which, extending out of two ends of the rebar are each sleeved with a corrugated sleeve.

The sheathing optical cable according to an embodiment of the present disclosure, two ends of which, extending out of two ends of the rebar are each sleeved with a corrugated sleeve is shown in FIG. 3. It can be seen from FIG. 3 that the corrugated sleeve is sleeved at each of two parts of the sheathing optical cable extending out of the two ends of the rebar and enters a part of the notch groove of the rebar.

The steel fiber composite intelligent bar with a sheathing optical cable embedded in an inner core of a rebar provided by the present disclosure includes the winding layer 8. In some embodiments of the present disclosure, the winding layer 8 is wound around an outer surface of the rebar 5, and a material of the winding layer 8 is an epoxy resin composite fiber; and the winding layer has a thickness of 1 mm to 2 mm, and preferably 2 mm. The thickness of the winding layer can be determined according to the actual situation in the art.

Figure 4:
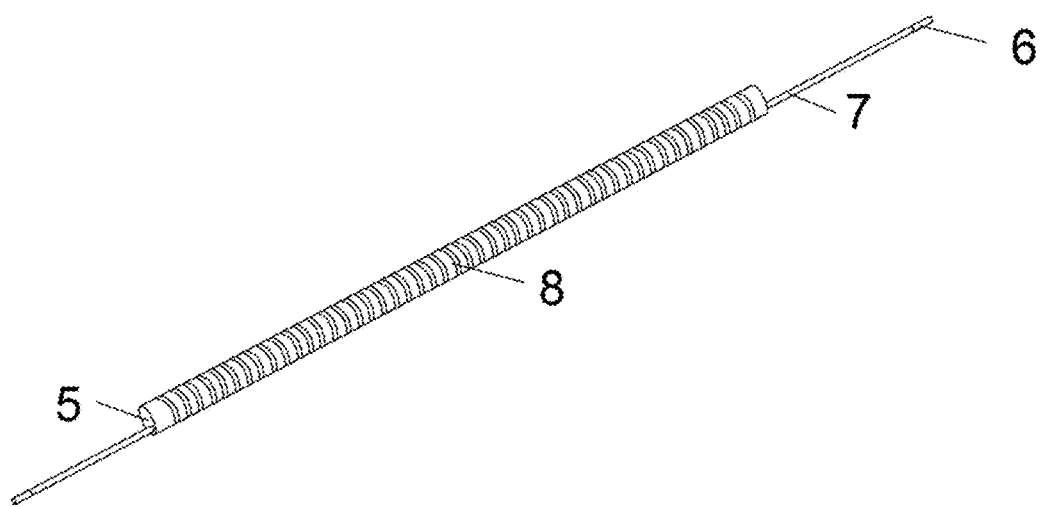
FIG. 4 shows a schematic diagram of the rebar with the winding layer according to an embodiment of the present disclosure.

The structure of the rebar with the winding layer according to an embodiment of the present disclosure is shown in FIG. 4. It can be seen from FIG. 4 that the epoxy resin composite fiber is wound around the rebar to form the winding layer.

An outer surface of the steel fiber composite intelligent bar with a sheathing optical cable embedded in an inner core of a rebar provided in the present disclosure can provide a rib, and a corresponding rib spacing and rib depth can be provided through winding with a fiber bundle.

The steel fiber composite intelligent bar with a sheathing optical cable embedded in an inner core of a rebar provided by the present disclosure includes tightening sheaths 9. In the present disclosure, the tightening sheaths 9 include a first tightening sheath and a second tightening sheath which are sleeved at two ends of the winding layer 8, respectively.

In some embodiments of the present disclosure, the tightening sheaths 9 are each sleeved at two ends of the winding layer 8 by 20 mm, respectively, and the tightening sheaths 9 are each at least 50 mm shorter than the sheathing optical cable 6.

Figure 5:
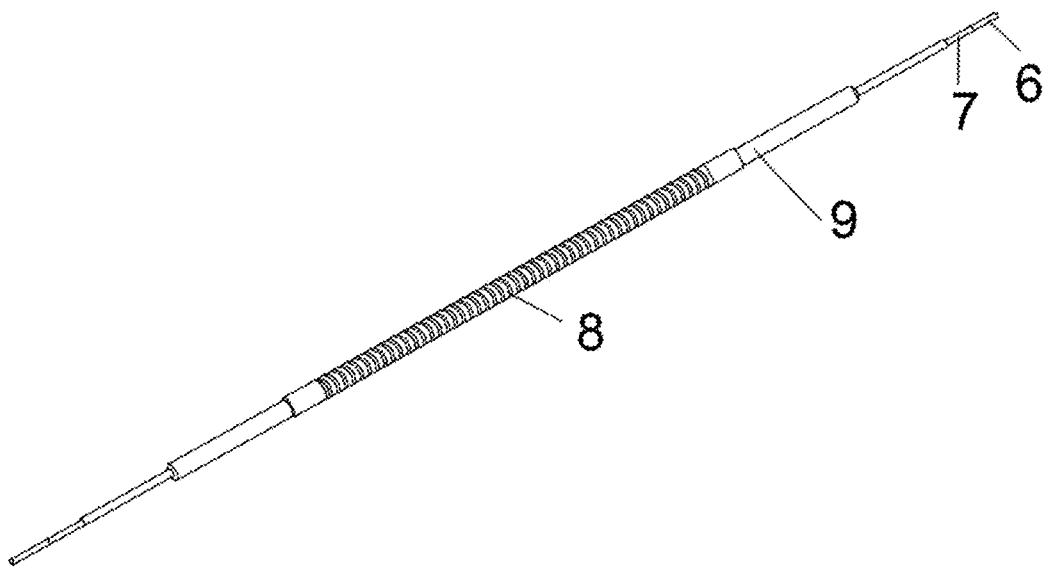
FIG. 5 shows a schematic diagram of the steel fiber composite intelligent bar with a sheathing optical cable embedded in an inner core of a rebar according to an embodiment of the present disclosure.

The structure of the steel fiber composite intelligent bar with a sheathing optical cable embedded in an inner core of a rebar according to an embodiment of the present disclosure is shown in FIG. 5. It can be seen from FIG. 5 that the tightening sheaths are each sleeved at a part of the winding layer from the two ends of the sheathing optical cable.

The present disclosure also provides a method for fabricating the steel fiber composite intelligent bar as described in the above technical solutions, including:
- notching a groove along a length direction of the rebar 5 to form the notch groove 4;
- fixing the sheathing optical cable 6 in the notch groove 4 in parallel, winding the rebar 5 with an epoxy resin composite fiber, and curing to obtain a rebar 5 clad with the winding layer 8; and
- sleeving the tightening sheaths 9 at two ends of the winding layer 8 from the sheathing optical cable 6 respectively to obtain the steel fiber composite intelligent bar,
- wherein the sheathing optical cable 6 extends out of two ends of the rebar 5.

In the present disclosure, a groove is notched along a length direction of the rebar 5 to form the notch groove 4.

In some embodiments of the present disclosure, the rebar 5 is a plain round rebar. There are no special limitations on the diameter and strength of the rebar, which can be determined according to actual engineering needs, such as a grade HPB300 or HPB400 and a diameter of 6 mm, 8 mm, 10 mm, or 14 mm. In some embodiments of the present disclosure, the rebar 5 is specifically an HPB400 plain round rebar having a diameter of 6 mm. In the present disclosure, the selection of the plain round rebar can ensure that the fiber is perfectly bonded with the surface of the rebar and is evenly wound around the surface of the rebar, such that the composite intelligent bar is evenly stressed in a working state.

In some embodiments of the present disclosure, a device for the notching is a metal notching machine.

In some embodiments of the present disclosure, after the notch groove 4 is formed, the rebar 5 is subjected to stain removal. In some embodiments of the present disclosure, the stain removal is conducted by: removing the rust stains on a surface of the rebar 5 with a sandpaper, and then the surface of the rebar 5 is cleaned to remove oil stains, and a solvent used for the cleaning is acetone. There are no special limitations on the type of the sandpaper and the amount of the solvent used for the cleaning, which can be determined according to actual needs.

In the present disclosure, after the stain removal, the sheathing optical cable 6 is fixed in the notch groove 4 in parallel.

In the present disclosure, the fixing the sheathing optical cable 6 in the notch groove 4 in parallel is conducted by: bonding and fixing the sheathing optical cable 6 with an adhesive tape, and then encapsulating the notch groove 4 with a glue, where the adhesive tape is a transparent adhesive tape, and the glue is a 502 glue or an epoxy resin, and preferably a 502 glue.

There are no special limitations on the type of the glue, and the glue well known in the art may be used. There are no special limitations on the process of the encapsulating with the glue, and an appropriate encapsulation process can be selected according to the actual situation.

In the present disclosure, the method further includes: sleeving the corrugated sleeve 7 at each of the two parts of the sheathing optical cable 6 extending out of the two ends of the rebar 5. In some embodiments of the present disclosure, the sleeving the corrugated sleeve 7 at each of the two parts of the sheathing optical cable 6 extending out of the two ends of the rebar 5 is conducted by: reserving a non-sealing segment in each of two ends of the notch groove 4, sleeving the corrugated sleeve 7 at each of two ends of the sheathing optical cable 6, arranging the two ends of the sheathing optical cable 6 in non-sealing segments of the two ends of the notch groove 4, respectively, and encapsulating the non-sealing segments with a glue.

In some embodiments of the present disclosure, the non-sealing segment has a length of 10 mm; and a length of each of the two ends of the sheathing optical cable 6 extending out of the corrugated sleeve 7 is more than or equal to 50 mm, and preferably 50 mm.

In the present disclosure, the two ends of the sheathing optical cable 6 are each sleeved with the corrugated sleeve to prevent the sheathing optical cable from being largely damaged at an end of the notch-grooved rebar.

In the present disclosure, after the sheathing optical cable 6 is fixed in the notch groove 4 in parallel, the rebar 5 is wound with an epoxy resin composite fiber, and cured to obtain a rebar 5 clad with the winding layer 8.

In some embodiments of the present disclosure, the epoxy resin composite fiber includes an epoxy resin-impregnated fiber cloth and an epoxy resin-impregnated fiber bundle; a fiber cloth in the epoxy resin-impregnated fiber cloth is selected from the group consisting of a carbon fiber cloth, a glass fiber cloth, and a basalt fiber cloth, and preferably a carbon fiber cloth; and a fiber bundle in the epoxy resin-impregnated fiber bundle is selected from the group consisting of a carbon fiber, a basalt fiber, a glass fiber, an aramid fiber, and a plant fiber, and preferably a carbon fiber. In some embodiments of the present disclosure, the fiber cloth in the epoxy resin-impregnated fiber cloth is specifically an HITEX C200 carbon fiber cloth woven from 12K high-strength carbon fibers; and the epoxy resin in the epoxy resin-impregnated fiber cloth is a Lica-100 fiber cloth adhesive. There are no special limitations on the types and amounts of the epoxy resin, the fiber cloth, and the fiber bundle, which can be determined according to actual needs in the art.

In some embodiments of the present disclosure, the winding is conducted by the following steps: wrapping the sheathing optical cable 6-embedded rebar 5 with the epoxy resin-impregnated fiber cloth, and then winding circumferentially with the epoxy resin-impregnated fiber bundle. In some embodiments of the present disclosure, the winding circumferentially is conducted along a length direction of the rebar 5, and preferably, the fiber cloth is spread neatly. One end of the fiber cloth is temporarily fixed with an epoxy resin to the rebar, and then the fiber cloth is completely impregnated in the epoxy resin. The other end of the fiber cloth is pressed tightly with a steel plate, the rebar is slowly rotated from the end of the fiber cloth that is temporarily fixed to the rebar, and a stretching force perpendicular to an axial direction of the rebar is applied, such that the fiber cloth is tightly wrapped around an outer surface of the rebar. The excess epoxy resin is removed through axial squeezing along the rebar, and then the epoxy resin-impregnated fiber bundle is circumferentially wound around a surface of the fiber cloth.

In some embodiments of the present disclosure, before the winding, the two parts of the sheathing optical cable 6 extending out of the two ends of the rebar 5 are each wrapped with a plastic film, and the plastic film is a plastic wrap. In the present disclosure, the two parts of the sheathing optical cable extending out of the two ends of the rebar are each wrapped with the plastic film to prevent the sheathing optical cable from being impregnated or broken during the winding.

There are no special limitations on the mode of the curing, which can be determined according to the type of the epoxy resin used. In some embodiments of the present disclosure, the curing is conducted at a temperature of 30° C. to 35° C., and preferably 31° C. to 34° C.

In the present disclosure, after the rebar 5 clad with the winding layer 8 is obtained, the tightening sheaths 9 are sleeved at two ends of the winding layer 8 from the sheathing optical cable 6 respectively to obtain the steel fiber composite intelligent bar.

In some embodiments of the present disclosure, a diameter of each of the tightening sheaths 9 is 1 mm larger than that of the rebar 5 clad with the winding layer 8; the sheathing optical cable 6 is at least 50 mm longer than each of the tightening sheaths 9; and a length of an end of the rebar 5 clad with the winding layer 8 that is sleeved with each of the tightening sheaths 9 is at least 20 mm.

In the present disclosure, the sheathing optical cable is allowed to extend out of the two ends of the tightening sheaths to reserve a longer sheath cable for later welding of the sheathing optical cable with an optical fiber patch cord.

In some embodiments of the present disclosure, the method further includes: heating the tightening sheaths 9, and the heating is conducted with a flamethrower.

In the present disclosure, the tightening sheaths are heated to allow shrinkage, such that the tightening sheaths tightly wrap the winding layer.

The technical solutions in the present disclosure will be described below clearly and completely with reference to the examples in the present disclosure, but they should not be construed as limiting the protection scope of the present disclosure.

Example 1

A plain round rebar (an HPB400 plain round rebar having a diameter of 6 mm and a length of 550 mm, and the parameters of the plain round rebar are shown in Table 1) was notched with a metal notching machine along a length direction to form a square groove of 1 mm×1 mm. The plain round rebar was polished with a sandpaper to remove rusts on a surface thereof, and cleaned with acetone to remove oil stains on the surface thereof. A sheathing optical cable (a high-transmission and tightly-sheathed strain-sensing optical cable NZS-DSS-C07 having a diameter of 0.9 mm) was arranged along the notch groove, and encapsulated with a 502 glue in the notch groove of the plain round rebar after confirming a position with a transparent adhesive tape. A non-sealing segment was reserved within 10 mm at each of two ends of the notch-grooved plain round rebar. After the glue was cured, a stainless steel corrugated sleeve that had a diameter of 1 mm and was 50 mm shorter than the sheathing optical cable was sleeved at each of two ends of the sheathing optical cable, and arranged in the non-sealing segment of the notch groove, and then encapsulated with a glue. A 20-bundle fiber cloth (an HITEX C200 carbon fiber cloth woven from 12K high-strength carbon fibers) was cut and spread neatly. One end of the fiber cloth was temporarily fixed with a binder to the plain round rebar, two parts of the sheathing optical cable extending out of two ends of the plain round rebar were each wrapped with a plastic film, and then the fiber cloth was completely impregnated in a Lica-100 fiber cloth adhesive. The other end of the fiber cloth was pressed tightly with a steel plate, the plain round rebar was slowly rotated from the end of the fiber cloth that was temporarily fixed to the plain round rebar, and a stretching force perpendicular to an axial direction of the plain round rebar was applied, such that the fiber cloth tightly wrapped around an outer surface of the rebar. Then the excess adhesive was removed through axial squeezing along the plain round rebar, and then a Lica-100 fiber cloth adhesive-impregnated fiber bundle was circumferentially wound around a surface of the fiber cloth and cured at 35° C. to obtain a rebar clad with the winding layer (having a thickness of 1 mm). The sheathing optical cable was inserted into tightening sheaths, each of which had a diameter 1 mm larger than that of the rebar clad with the winding layer. The tightening sheaths were each sleeved at ends of the rebar clad with the winding layer by 20 mm, the tightening sheaths were each 50 mm shorter than the sheathing optical cable, and the tightening sheaths were heated with a flamethrower, such that the tightening sheaths were contracted to obtain a steel fiber composite intelligent bar with a sheathing optical cable embedded in a groove on a surface of an inner core of a rebar (the parameters of the steel fiber composite intelligent bar are shown in Table 2).

TABLE 1

Parameters of the plain round rebar

| Rebar type | Model | Yield strength (MPa) | Elastic modulus (GPa) | Diameter (mm) |
|---|---|---|---|---|
| Plain round rebar | HPB400 | 465 | 195 | 6 |

TABLE 2

Parameters of the steel fiber composite intelligent bar fabricated in Example 1

| Composite intelligent bar diameter (mm) | Fiber cloth | FRP thickness (mm) | Rebar core | Core diameter (mm) | Sheathing optical cable | Optical cable diameter (mm) |
|---|---|---|---|---|---|---|
| 8 | Carbon fiber cloth | 1 | HPB400 | 6 | NZS-DSS-C07 | 0.9 |

Example 2

A plain round rebar (an HPB400 plain round rebar having a diameter of 6 mm and a length of 550 mm, and the parameters of the plain round rebar are shown in Table 3) was notched with a metal notching machine along a length direction to form a square groove of 1 mm×1 mm. The plain round rebar was polished with a sandpaper to remove rusts on a surface thereof, and cleaned with acetone to remove oil stains on the surface thereof. A sheathing optical cable (a high-transmission and tightly-sheathed strain-sensing optical cable NZS-DSS-C07 having a diameter of 0.9 mm) was arranged along the notch groove, and encapsulated with a 502 glue in the notch groove of the plain round rebar after conforming a position with a transparent adhesive tape. A non-sealing segment was reserved within 10 mm at each of two ends of the notch-grooved plain round rebar. After the glue was cured, a stainless steel corrugated sleeve that had a diameter of 1 mm and was 50 mm shorter than the sheathing optical cable was sleeved at each of two ends of the sheathing optical cable, and arranged in the non-sealing segment of the notch groove, and then encapsulated with a glue. A 36-bundle fiber cloth (an HITEX C200 carbon fiber cloth woven from 12K high-strength carbon fibers) was cut and spread neatly. One end of the fiber cloth was temporarily fixed with a binder to the plain round rebar, two parts of the sheathing optical cable extending out of two ends of the plain round rebar were each wrapped with a plastic film, and then the fiber cloth was completely impregnated in a Lica-100 fiber cloth adhesive. The other end of the fiber cloth was pressed tightly with a steel plate, the plain round rebar was slowly rotated from the end of the fiber cloth that was temporarily fixed to the plain round rebar, and a stretching force perpendicular to an axial direction of the plain round rebar was applied, such that the fiber cloth tightly wrapped around an outer surface of the rebar. Then the excess adhesive was removed through axial squeezing along the plain round rebar, and then a Lica-100 fiber cloth adhesive-impregnated fiber bundle was circumferentially wound around a surface of the fiber cloth and cured at 35° C. to obtain a rebar clad with the winding layer (having a thickness of 2 mm). The sheathing optical cable was inserted into tightening sheaths, each of which had a diameter 1 mm larger than that of the rebar clad with the winding layer. The tightening sheaths were each sleeved at ends of the rebar clad with the winding layer by 20 mm, the tightening sheaths were each 50 mm shorter than the sheathing optical cable, and the tightening sheaths were heated with a flamethrower, such that the tightening sheaths were contracted to obtain a steel fiber composite intelligent bar with a sheathing optical cable embedded in a groove on a surface of an inner core of a rebar (the parameters of the steel fiber composite intelligent bar are shown in Table 4).

TABLE 3

Parameters of the plain round rebar

| Rebar type | Model | Yield strength (MPa) | Elastic modulus (GPa) | Diameter (mm) |
|---|---|---|---|---|
| Plain round rebar | HPB400 | 465 | 195 | 6 |

TABLE 4

Parameters of the steel fiber composite intelligent bar fabricated in Example 2

| Composite intelligent bar diameter (mm) | Fiber cloth | FRP thickness (mm) | Rebar core | Core diameter (mm) | Sheathing optical cable | Optical cable diameter (mm) |
|---|---|---|---|---|---|---|
| 10 | Carbon fiber cloth | 2 | HPB400 | 6 | NZS-DSS-C07 | 0.9 |

Example 3

A plain round rebar (an HPB400 plain round rebar having a diameter of 14 mm and a length of 550 mm, and the parameters of the plain round rebar are shown in Table 5) was notched with a metal notching machine along a length direction to form a square groove of 1 mm×1 mm. The plain round rebar was polished with a sandpaper to remove rusts on a surface thereof, and cleaned with acetone to remove oil stains on the surface thereof. A sheathing optical cable (a high-transmission and tightly-sheathed strain-sensing optical cable NZS-DSS-C07 having a diameter of 0.9 mm) was arranged along the notch groove, and encapsulated with a 502 glue in the notch groove of the plain round rebar after conforming a position with a transparent adhesive tape. A non-sealing segment was reserved within 10 mm at each of two ends of the notch-grooved plain round rebar. After the glue was cured, a stainless steel corrugated sleeve that had a diameter of 1 mm and was 50 mm shorter than the sheathing optical cable was sleeved at each of two ends of the sheathing optical cable, and arranged in the non-sealing segment of the notch groove, and then encapsulated with a glue. A 25-bundle fiber cloth (an HITEX C200 carbon fiber cloth woven from 12K high-strength carbon fibers) was cut and spread neatly. One end of the fiber cloth was temporarily fixed with a binder to the plain round rebar, two parts of the sheathing optical cable extending out of two ends of the plain round rebar were each wrapped with a plastic film, and then the fiber cloth was completely impregnated in a Lica-100 fiber cloth adhesive. The other end of the fiber cloth was pressed tightly with a steel plate, the plain round rebar was slowly rotated from the end of the fiber cloth that was temporarily fixed to the plain round rebar, and a stretching force perpendicular to an axial direction of the plain round rebar was applied, such that the fiber cloth tightly wrapped around an outer surface of the rebar. Then the excess adhesive was removed through axial squeezing along the plain round rebar, and then a Lica-100 fiber cloth adhesive-impregnated fiber bundle was circumferentially wound around a surface of the fiber cloth and cured at 35° C. to obtain a rebar clad with the winding layer (having a thickness of 1 mm). The sheathing optical cable was inserted into tightening sheaths, each of which had a diameter 1 mm larger than that of the rebar clad with the winding layer. The tightening sheaths were each sleeved at ends of the rebar clad with the winding layer by 20 mm. the tightening sheaths were each 50 mm shorter than the sheathing optical cable, and the tightening sheaths were heated with a flamethrower, such that the tightening sheaths were contracted to obtain a steel fiber composite intelligent bar with a sheathing optical cable embedded in a groove on a surface of an inner core of a rebar (the parameters of the steel fiber composite intelligent bar are shown in Table 6).

TABLE 5

Parameters of the plain round rebar

| Rebar type | Model | Yield strength (MPa) | Elastic modulus (GPa) | Diameter (mm) |
|---|---|---|---|---|
| Plain round rebar | HPB400 | 451 | 200 | 14 |

TABLE 6

Parameters of the steel fiber composite intelligent bar fabricated in Example 3

| Composite intelligent bar diameter (mm) | Fiber cloth | FRP thickness (mm) | Rebar core | Core diameter (mm) | Sheathing optical cable | Optical cable diameter (mm) |
|---|---|---|---|---|---|---|
| 16 | Carbon fiber cloth | 1 | HPB400 | 14 | NZS-DSS-C07 | 0.9 |

Figure 6:
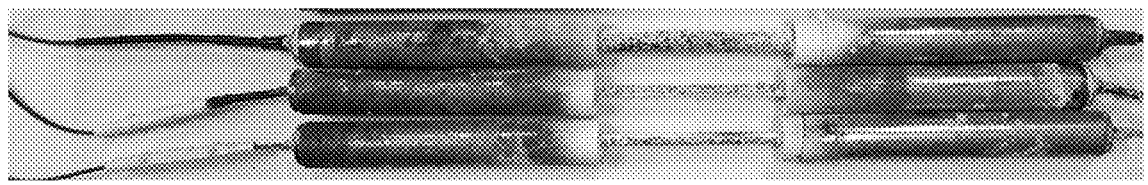
FIG. 6 is a graph showing the uniaxial tensile samples of the steel fiber composite intelligent bars fabricated in Examples 1 to 3.
Figure 7:
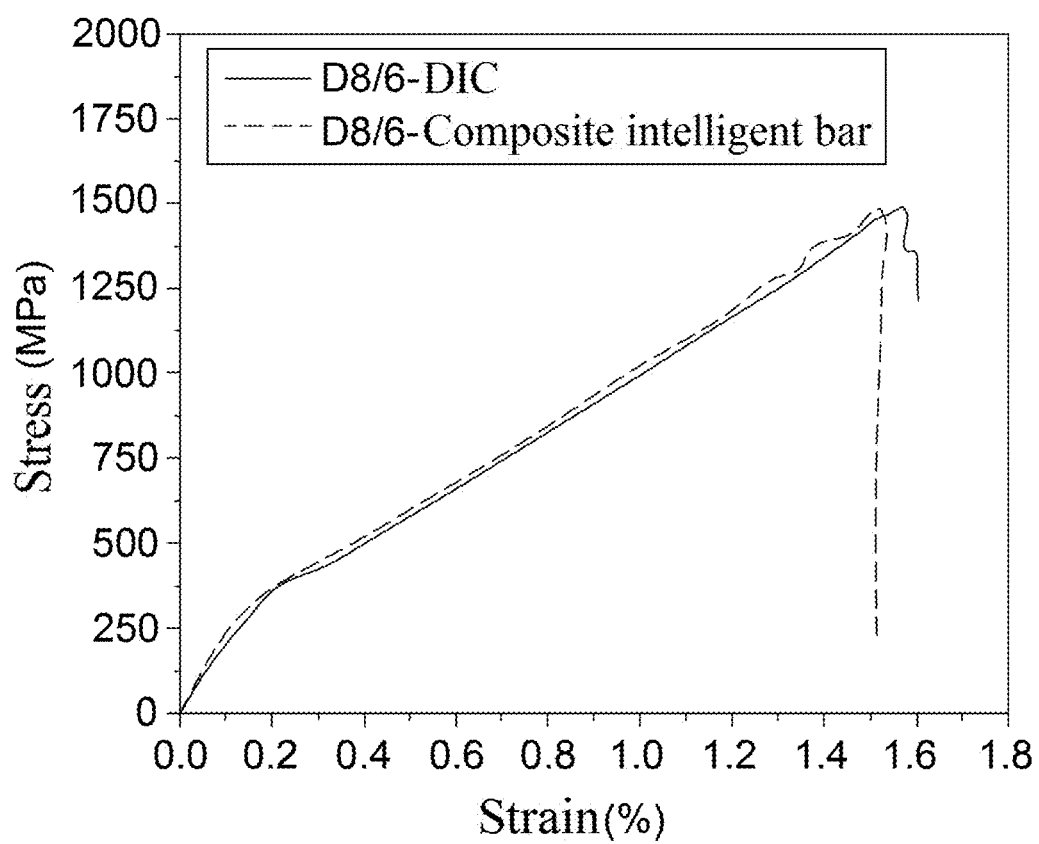
FIG. 7 shows a comparison graph of the stress-strain relationship between the steel fiber composite intelligent bar with a sheathing optical cable embedded in an inner core of a rebar fabricated in Example 1 of the present disclosure and digital image correlation (DIC).
Figure 8:
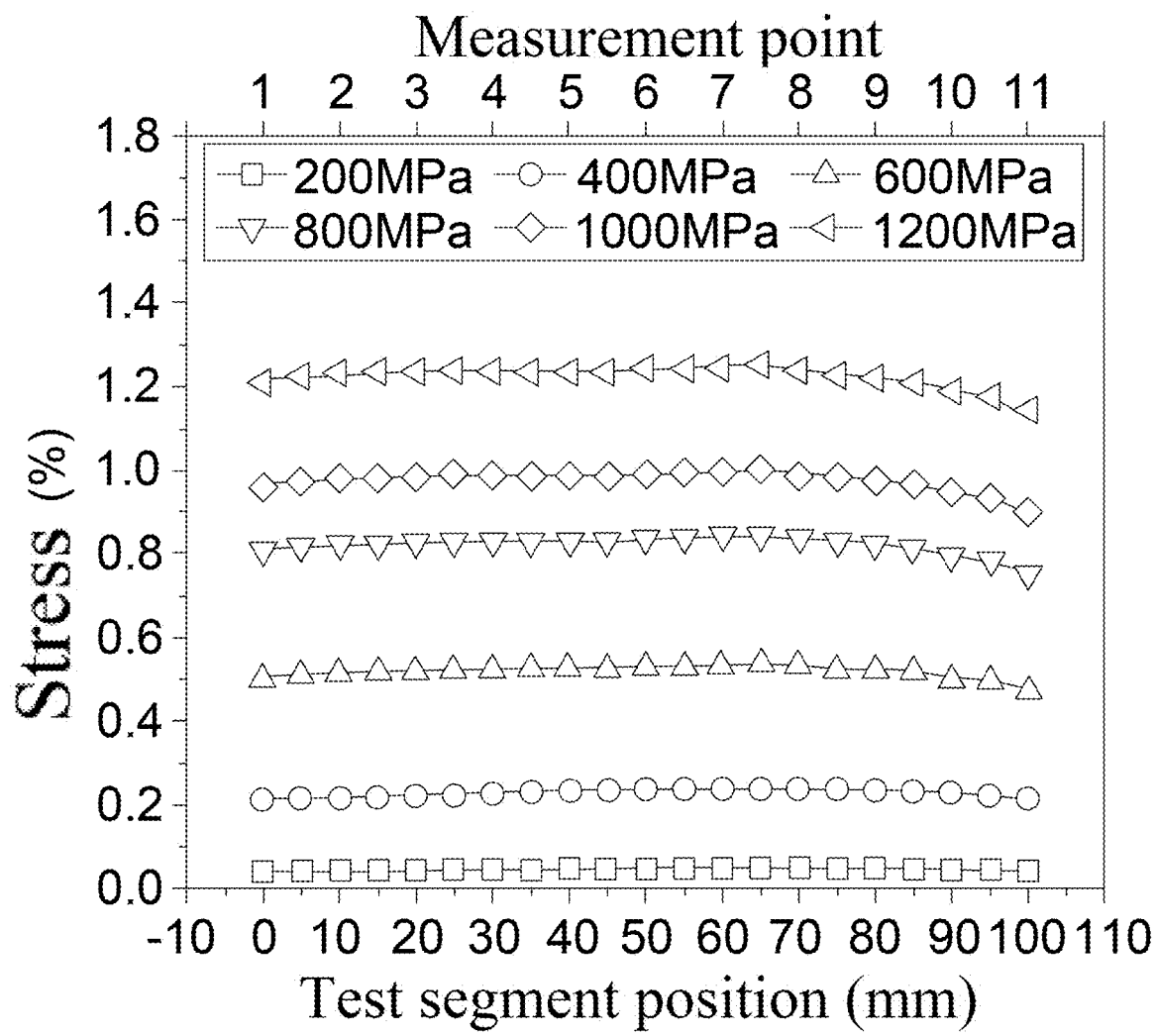
FIG. 8 shows a strain distribution diagram of the steel fiber composite intelligent bar with a sheathing optical cable embedded in an inner core of a rebar fabricated in Example 1 of the present disclosure.

Performance Tests (1) In order to test the monitoring accuracy of the strain signal of the steel fiber composite intelligent bar, a uniaxial tensile test for the steel fiber composite intelligent bar with a sheathing optical cable embedded in an inner core of a rebar fabricated in Example 1 was conducted using MTS at a loading rate of 0.5 mm/min, and the strain data acquired by a non-contact strain test system DIC were compared with the data monitored by the sheathing optical cable of the composite intelligent bar. The specific operations were conducted by the following steps: before the test, two ends of the steel fiber composite intelligent bar had to be inserted into a steel pipe having an diameter of 32 mm and an inner diameter of 25 mm, an expanded cement was poured into the steel pipe for end reinforcement, and a test segment had to meet a black speckle on a white background for a DIC test. A uniaxial tensile sample of the steel fiber composite intelligent bar is shown in FIG. 6. Stress-strain curves of the composite intelligent bar plotted with the strain data monitored by DIC and the composite intelligent bar are shown in FIG. 7. The distributions of the strains monitored by the intelligent composite bar under different stresses are shown in FIG. 8.

As shown in FIG. 7, stress-strain curves of the composite intelligent bar are plotted with the strain data monitored by the DIC and the composite intelligent bar, respectively. In FIG. 7, the strain monitored by the DIC refers to the average strain over a 100 mm-long test segment output by the check extensometer function of the VIC-3D software. The strain monitored by the intelligent composite bar refers to the strains of a series of measurement points with a spatial resolution of 1 mm over a 100 mm-long test segment of the sheathing optical cable acquired by the OSI series acquisition software. The average strain can be calculated according to a formula $$\bar{\varepsilon} = \left(\sum_{i=1}^{11} \varepsilon_i \Delta L\right) / L,$$

wherein $\bar{\varepsilon}$ represents the average strain of the test segment; $\varepsilon_i$ represents a strain of the ith position; $\Delta L$=1 mm, which represents a spatial resolution; and L=100 mm, which represents a length of a test segment. It can be seen from the results in FIG. 7 that the stress-strain data of the composite intelligent bar plotted with the strain data monitored by DIC and the composite intelligent bar are consistent, and the maximum monitored strain of the composite intelligent bar is similar to an FRP fracture strain, indicating that the steel fiber composite intelligent bar has a high strain monitoring accuracy and has an ability to self-perceive its whole service process (performance test results of the steel fiber composite intelligent bar are shown in Table 7).

TABLE 7

Performance test results of the steel fiber composite intelligent bar fabricated in Example 1

| Yield strain (%) | Yield strength (MPa) | FRP fracture strain (%) | FRP fracture strength (MPa) | Maximum monitored strain of the steel fiber composite intelligent bar (%) |
|---|---|---|---|---|
| 0.19 | 363 | 1.57 | 1491 | 1.53 |

It can be seen from FIG. 8 that the strains of the steel fiber composite intelligent bar fabricated in Example 1 in the test segment are basically consistent, indicating that the composite intelligent bar undergoes a uniform stress during a loading process and has stable strain monitoring performance.

Figure 9:
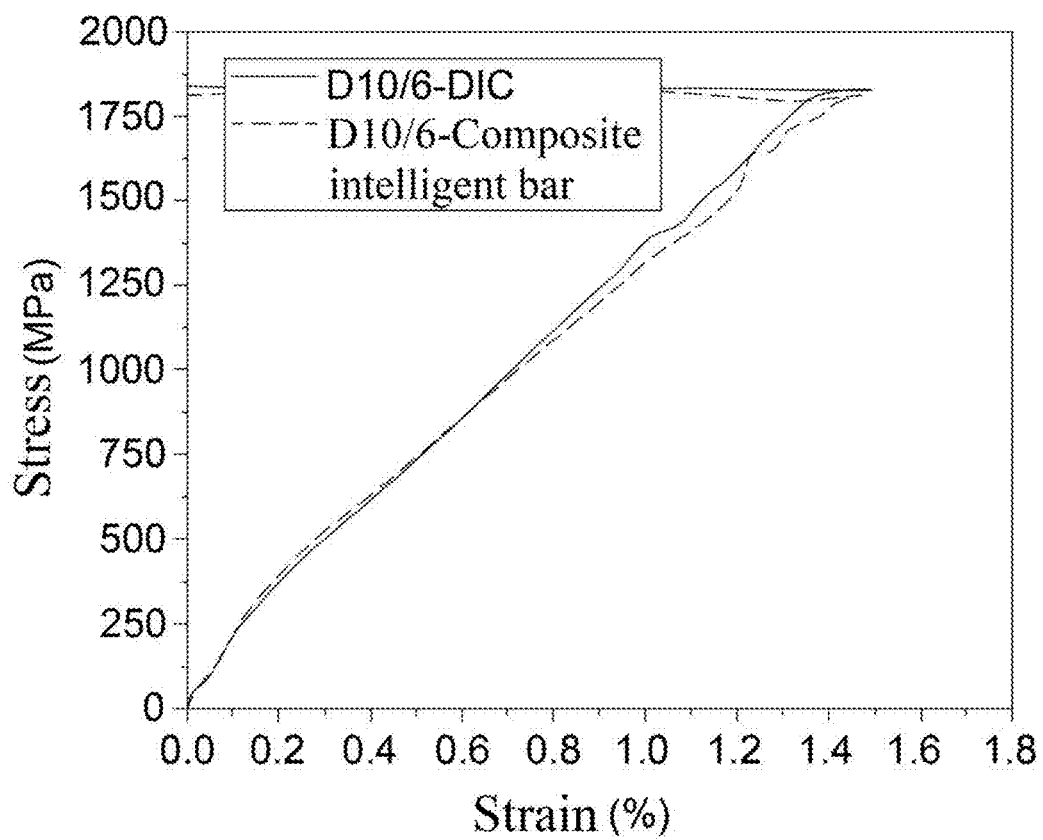
FIG. 9 shows a comparison graph of the stress-strain relationship between the steel fiber composite intelligent bar with a sheathing optical cable embedded in an inner core of a rebar fabricated in Example 2 of the present disclosure and DIC.
Figure 10:
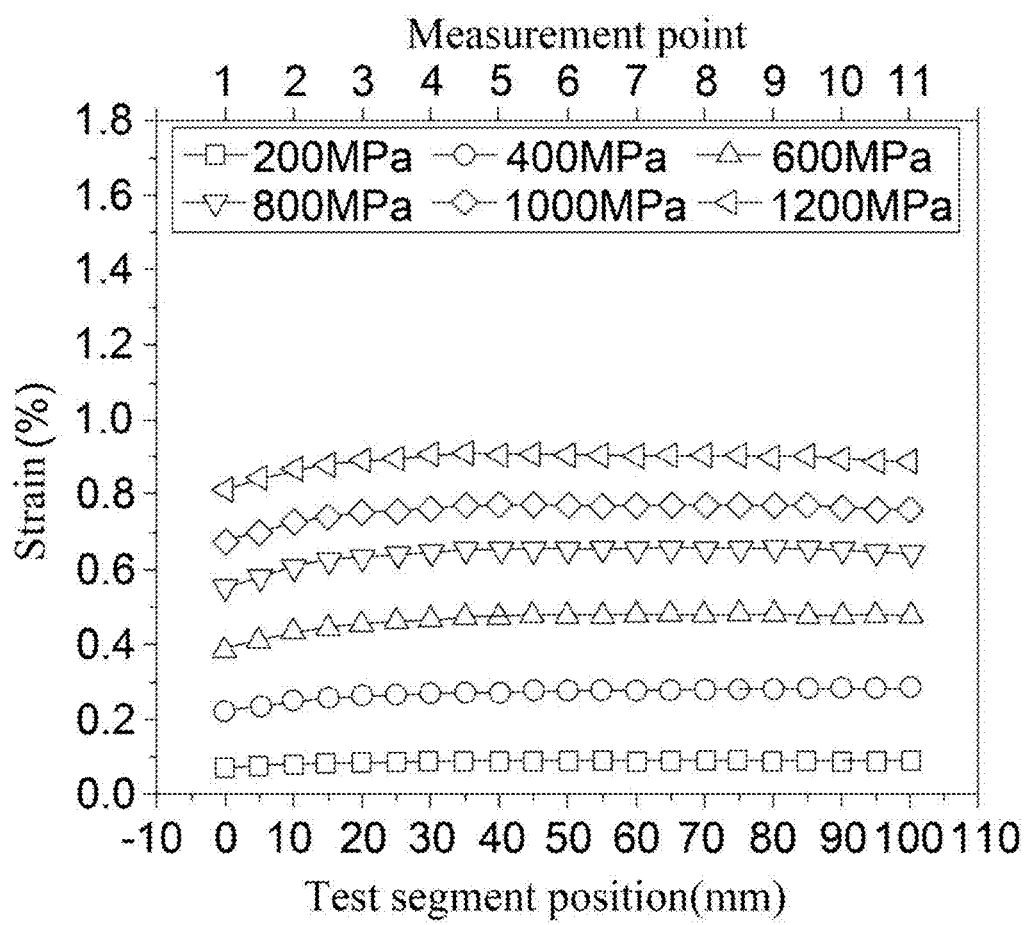
FIG. 10 shows a strain distribution of the steel fiber composite intelligent bar with a sheathing optical cable embedded in an inner core of a rebar fabricated in Example 2 of the present disclosure.

(2) In order to test the monitoring accuracy of the strain signal of the steel fiber composite intelligent bar, a uniaxial tensile test for the steel fiber composite intelligent bar with a sheathing optical cable embedded in an inner core of a rebar fabricated in Example 2 was conducted using MTS at a loading rate of 0.5 mm/min, and the strain data acquired by a non-contact strain test system DIC were compared with the data monitored by the sheathing optical cable of the composite intelligent bar. The specific operations were conducted by the following steps: before the test, two ends of the steel fiber composite intelligent bar had to be inserted into a steel pipe having a diameter of 32 mm and an inner diameter of 25 mm, an expanded cement was poured into the steel pipe for end reinforcement; and a test segment had to meet a black speckle on a white background for a DIC test. A uniaxial tensile sample of the steel fiber composite intelligent bar is shown in FIG. 6. Stress-strain curves of the composite intelligent bar plotted with the strain data monitored by DIC and the composite intelligent bar are shown in FIG. 9. The distributions of the strains monitored by the intelligent composite bar under different stresses are shown in FIG. 10.

As shown in FIG. 9, stress-strain curves of the composite intelligent bar are plotted with the strain data monitored by the DIC and the composite intelligent bar, respectively. In FIG. 9, the strain monitored by the DIC refers to the average strain over a 100 mm-long test segment output by the check extensometer function of the VIC-3D software. The strain monitored by the intelligent composite bar refers to the strains of a series of measurement points with a spatial resolution of 1 mm over a 100 mm-long test segment of the sheathing optical cable acquired by the OSI series acquisition software. The average strain can be calculated according to a formula $$\bar{\varepsilon} = \left(\sum_{i=1}^{11} \varepsilon_i \Delta L\right)/L,$$

wherein $\bar{\varepsilon}$ represents the average strain of the test segment; $\varepsilon_i$ represents a strain of the ith position; $\Delta L=1$ mm, which represents a spatial resolution; and $L=100$ mm, which represents a length of a test segment. It can be seen from the results in FIG. 9 that the stress-strain data of the composite intelligent bar plotted with the strain data monitored by DIC and the composite intelligent bar are basically consistent, and the maximum monitored strain of the composite intelligent bar is similar to an FRP fracture strain, indicating that the steel fiber composite intelligent bar has a high strain monitoring accuracy and has an ability to self-perceive its whole service process (performance test results of the steel fiber composite intelligent bar are shown in Table 8).

TABLE 8

Performance test results of the steel fiber composite intelligent bar fabricated in Example 2

| Yield strain (%) | Yield strength (MPa) | FRP fracture strain (%) | FRP fracture strength (MPa) | Maximum monitored strain of the steel fiber composite intelligent bar (%) |
|---|---|---|---|---|
| 0.17 | 349 | 1.50 | 1845 | 1.39 |

It can be seen from FIG. 10 that the strains of the steel fiber composite intelligent bar fabricated in Example 2 in the test segment are basically consistent, indicating that the composite intelligent bar undergoes a uniform stress during a loading process and has stable strain monitoring performance.

Figure 11:
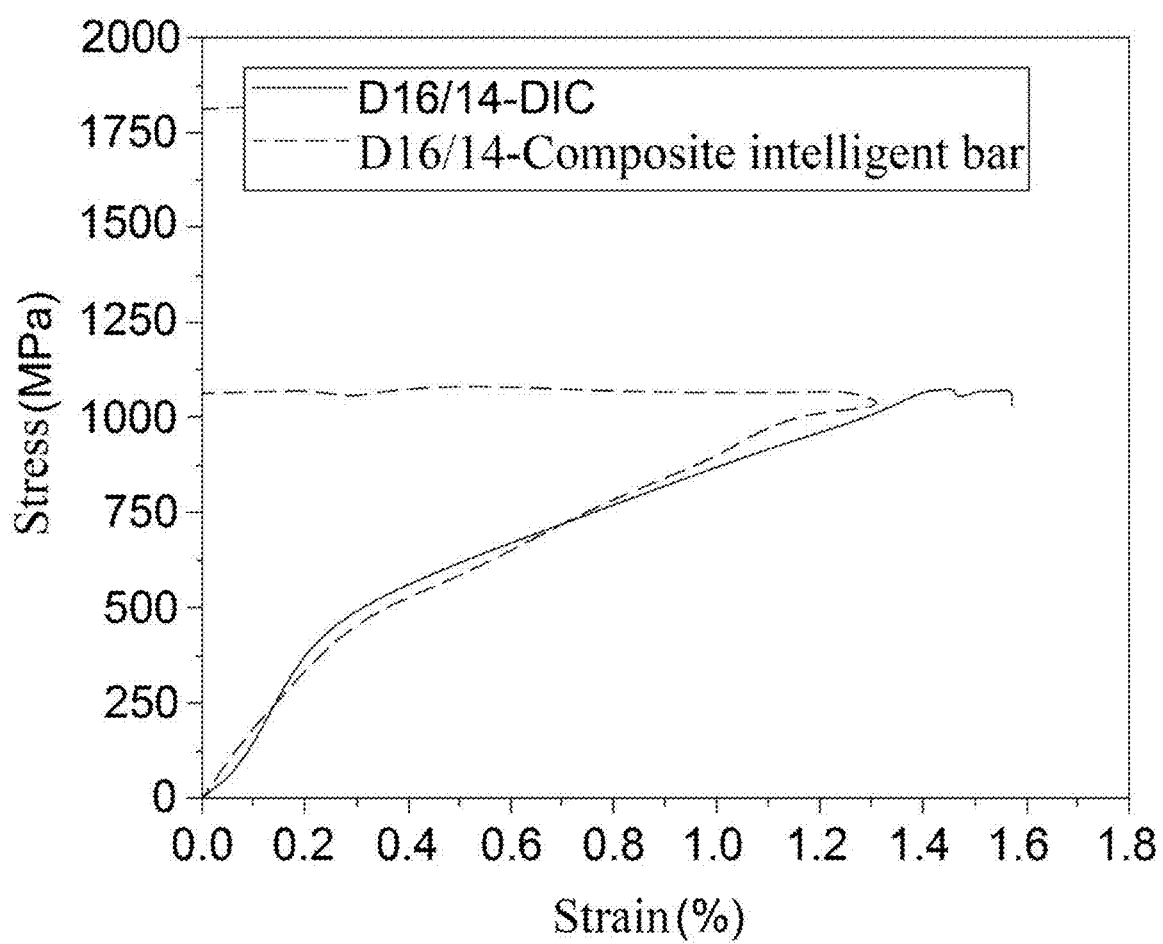
FIG. 11 shows a comparison graph of the stress-strain relationship between the steel fiber composite intelligent bar with a sheathing optical cable embedded in an inner core of a rebar fabricated in Example 3 of the present disclosure and DIC.
Figure 12:
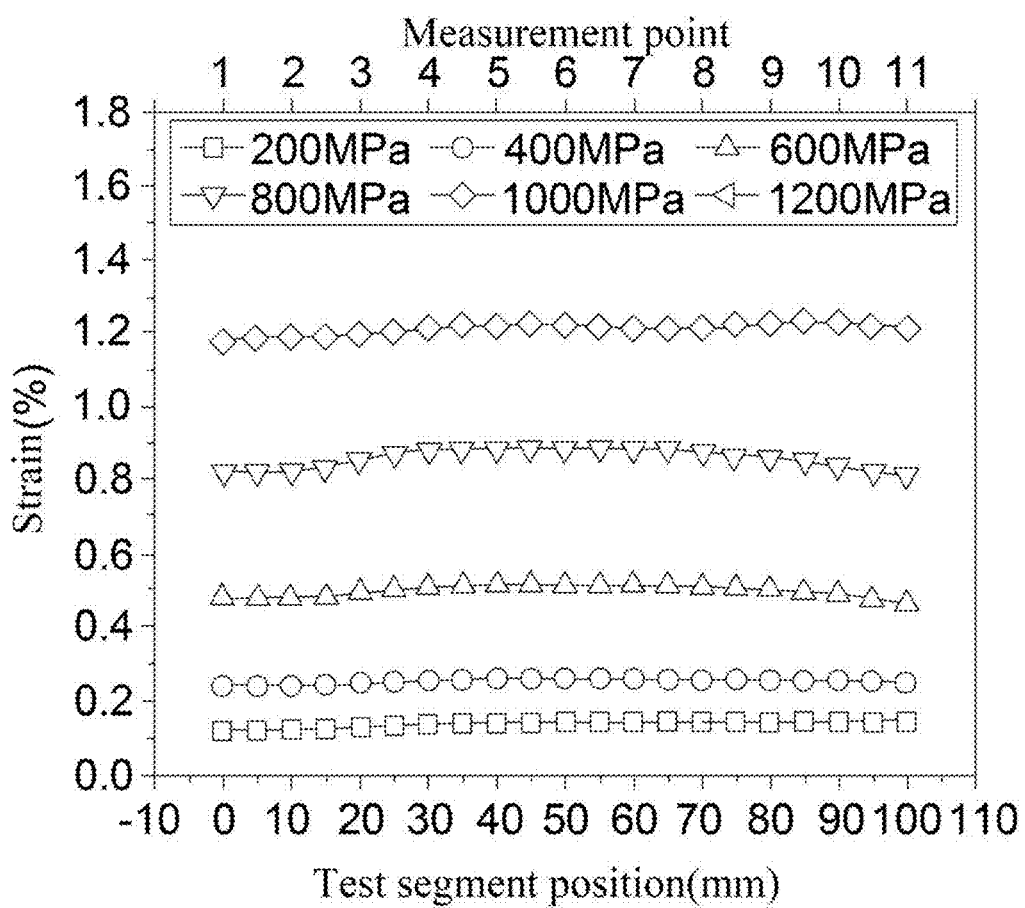
FIG. 12 shows a strain distribution of the steel fiber composite intelligent bar with a sheathing optical cable embedded in an inner core of a rebar fabricated in Example 3 of the present disclosure.

(3) In order to test the monitoring accuracy of the strain signal of the steel fiber composite intelligent bar, a uniaxial tensile test for the steel fiber composite intelligent bar with a sheathing optical cable embedded in an inner core of a rebar fabricated in Example 3 was conducted using MTS at a loading rate of 0.5 mm/min, and the strain data acquired by a non-contact strain test system DIC were compared with the data monitored by the sheathing optical cable of the composite intelligent bar. The specific operations were conducted by the following steps: before the test, two ends of the steel fiber composite intelligent bar had to be inserted into a steel pipe having a diameter of 32 mm and an inner diameter of 25 mm, an expanded cement was poured into the steel pipe for end reinforcement, and a test segment had to meet a black speckle on a white background for a DIC test. A uniaxial tensile sample of the steel fiber composite intelligent bar is shown in FIG. 6. Stress-strain curves of the composite intelligent bar plotted with the strain data monitored by DIC and the composite intelligent bar are shown in FIG. 11. The distributions of the strains monitored by the intelligent composite bar under different stresses are shown in FIG. 12.

As shown in FIG. 11, stress-strain curves of the composite intelligent bar are plotted with the strain data monitored by the DIC and the composite intelligent bar, respectively. In FIG. 11, the strain monitored by the DIC refers to the average strain over a 100 mm-long test segment output by the check extensometer function of the VIC-3D software. The strain monitored by the intelligent composite bar refers to the strains of a series of measurement points with a spatial resolution of 1 mm over a 100 mm-long test segment of the sheathing optical cable acquired by the OSI series acquisition software. The average strain can be calculated according to a formula $$\bar{\varepsilon} = \left(\sum_{i=1}^{11} \varepsilon_i \Delta L\right)/L,$$

wherein $\bar{\varepsilon}$ represents the average strain of the test segment; $\varepsilon_i$ represents a strain of the ith position; $\Delta L=1$ mm, which represents a spatial resolution; and $L=100$ mm, which represents a length of the test segment. It can be seen from the results in FIG. 11 that the stress-strain data of the composite intelligent bar plotted with the strain data monitored by DIC and the composite intelligent bar are consistent, indicating that the steel fiber composite intelligent bar has a high strain monitoring accuracy (performance test results of the steel fiber composite intelligent bar are shown in Table 9).

TABLE 9

Performance test results of the steel fiber composite intelligent bar fabricated in Example 3

| Yield strain (%) | Yield strength (MPa) | FRP fracture strain (%) | FRP fracture strength (MPa) | Maximum monitored strain of the steel fiber composite intelligent bar (%) |
|---|---|---|---|---|
| 0.25 | 439 | 1.55 | 1070 | 1.29 |

It can be seen from FIG. 12 that the strains of the steel fiber composite intelligent bar fabricated in Example 3 in the test segment are basically consistent, indicating that the composite intelligent bar undergoes a uniform stress during a loading process and has stable strain monitoring performance.

Although the above examples have described the present disclosure in detail, they are merely a part of, not all of the embodiments of the present disclosure. Other embodiments may also be obtained by persons based on the examples without creative efforts, and all of these embodiments shall fall within the scope of the present disclosure.

What is claimed is:

1. A steel fiber composite intelligent bar with a sheathing optical cable embedded in an inner core of a rebar, comprising the sheathing optical cable, the rebar, a winding layer, and tightening sheaths, wherein
the sheathing optical cable comprises a glass fiber core, a polyimide coating layer, and a polyurethane wrapping layer that are stacked sequentially from inside to outside;
the rebar is provided with a notch groove along a length direction; and the sheathing optical cable is embedded in the notch groove in parallel;
the winding layer is wound around an outer surface of the rebar, and the sheathing optical cable is at an interface between the winding layer and the rebar, the winding layer being made of an epoxy resin composite fiber; and the tightening sheaths comprise a first tightening sheath and a second tightening sheath which are sleeved at two ends of the winding layer, respectively.

2. The steel fiber composite intelligent bar of claim 1, wherein the sheathing optical cable has a diameter of less than 1 mm.

3. The steel fiber composite intelligent bar of claim 1 wherein a length of the sheathing optical cable is greater than that of the rebar, the sheathing optical cable extends out of two ends of the rebar, and two parts of the sheathing optical cable extending out of the two ends of the rebar are each sleeved with a corrugated sleeve.

4. The steel fiber composite intelligent bar of claim 3, wherein the corrugated sleeve has an inner diameter of 1 mm.

5. The steel fiber composite intelligent bar of claim 1, wherein the notch groove is a square groove of 1 mm×1 mm.

6. The steel fiber composite intelligent bar of claim 1, wherein the tightening sheaths are each sleeved at two ends of the winding layer by 20 mm, and the tightening sheaths are each at least 50 mm shorter than the sheathing optical cable.

7. A method for fabricating a steel fiber composite intelligent bar, comprising:

notching a groove along a length direction of a rebar to form a notch groove;

fixing a sheathing optical cable in the notch groove in parallel, winding the rebar with an epoxy resin composite fiber, and curing to obtain a rebar clad with a winding layer, the sheathing optical cable being positioned at an interface between the winding layer and the rebar and extending out of two ends of the rebar, the sheathing optical cable comprising a glass fiber core, a polyimide coating layer, and a polyurethane wrapping layer that are stacked sequentially from inside to outside; and sleeving tightening sheaths at two ends of the winding layer from the sheathing optical cable respectively to obtain the steel fiber composite intelligent bar.

8. The method of claim 7, wherein the fixing the sheathing optical cable in the notch groove in parallel is conducted by: bonding and fixing the sheathing optical cable with an adhesive tape, and then encapsulating the notch groove with a glue.

9. The method of claim 7, further comprising: sleeving the corrugated sleeve at each of two parts of the sheathing optical cable extending out of the two ends of the rebar.

10. The method of claim 7, further comprising: heating the tightening sheaths.

* * * * *